(12) United States Patent
Buresch et al.

(10) Patent No.: US 9,023,485 B2
(45) Date of Patent: *May 5, 2015

(54) ELECTROOPTICAL OR ELECTROMECHANICAL COMPONENT OR SLIDING ELEMENT

(75) Inventors: Isabell Buresch, Illertissen (DE); Dieter Stock, Wain (DE); Thorsten Weireter, Heidenheim (DE)

(73) Assignee: Wieland-Werke AG, Ulm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/576,303

(22) PCT Filed: Feb. 8, 2011

(86) PCT No.: PCT/EP2011/000583
§ 371 (c)(1),
(2), (4) Date: Jul. 31, 2012

(87) PCT Pub. No.: WO2011/098256
PCT Pub. Date: Aug. 18, 2011

(65) Prior Publication Data
US 2012/0301740 A1    Nov. 29, 2012

(30) Foreign Application Priority Data
Feb. 11, 2010   (DE) .......................... 10 2010 007 840

(51) Int. Cl.
*B32B 3/30*     (2006.01)
*H01B 5/00*     (2006.01)
(Continued)

(52) U.S. Cl.
CPC ......... *H01R 13/03* (2013.01); *Y10T 428/12389* (2015.01); *B32B 3/00* (2013.01);
(Continued)

(58) Field of Classification Search
CPC ............ B32B 3/00; B32B 3/30; B32B 15/01; B32B 15/013; B32B 15/018; B32B 15/04; Y10T 428/12389; Y10T 428/12451; Y10T 428/12736; Y10T 428/12903; Y10T 428/12979; Y10T 428/12933
USPC ......... 428/600, 612, 606, 607, 650, 651, 652, 428/653, 660, 661, 674, 675, 676, 677, 678, 428/679, 680, 681, 682, 683, 684, 685, 687, 428/658, 659, 646, 647, 648, 670
See application file for complete search history.

(56) References Cited

U.S. PATENT DOCUMENTS 3,615,442 A * 10/1971 Geris et al. .................... 430/310
3,660,176 A *  5/1972 Denhard, Jr. .................. 148/565
(Continued)

FOREIGN PATENT DOCUMENTS

DE      101 59 761 A1    7/2002
EP      1 146 971 B1    10/2001
(Continued)

OTHER PUBLICATIONS

Machine Translation, Suzuki et al., JP 06-116745, Apr. 1994.*
(Continued)

*Primary Examiner* — Michael E La Villa
(74) *Attorney, Agent, or Firm* — Flynn, Thiel, Boutell & Tanis, P.C.

(57) ABSTRACT

The invention relates to an electro-optical or electromechanical structural component, in particular, an LED, connector or stamped grid, or sliding element, made of a rolled metal substrate of a metal strip, or a sheet produced therefrom, made of Cu or a Cu alloy strip, Al or an Al alloy strip, Fe or a Fe alloy strip, Ti or a Ti alloy strip, Ni or a Ni alloy strip or a stainless steel strip, which has a specially structured surface. The structure of the surface allows joining using optical methods, even in the case of highly reflective surface coatings, and simultaneously improves the functional properties of the components used.

14 Claims, 1 Drawing Sheet

(51) Int. Cl.
*H01R 13/03* (2006.01)
*B32B 3/00* (2006.01)
*B32B 15/01* (2006.01)
*C25D 7/06* (2006.01)
*B21B 1/22* (2006.01)
*B21B 3/00* (2006.01)

(52) U.S. Cl.
CPC .......... *B32B 3/30* (2013.01); *Y10T 428/12451* (2015.01); *Y10T 428/12736* (2015.01); *Y10T 428/12903* (2015.01); *Y10T 428/12979* (2015.01); *Y10T 428/12993* (2015.01); *B21B 1/227* (2013.01); *B21B 3/00* (2013.01); *B32B 15/01* (2013.01); *B32B 15/013* (2013.01); *B32B 15/018* (2013.01)

(56) References Cited

U.S. PATENT DOCUMENTS

| | | | |
|---|---|---|---|
| 4,415,236 | A | 11/1983 | Perregaux |
| 5,986,205 | A | 11/1999 | Matsune et al. |
| 6,138,490 | A | 10/2000 | Shannon |
| 6,324,978 | B1 * | 12/2001 | Kaulen et al. .............. 101/459 |
| 6,657,354 | B2 | 12/2003 | Inoue |
| 6,753,635 | B2 | 6/2004 | Kuhlmann-Wilsdorf |
| 7,857,470 | B2 | 12/2010 | Nishi et al. |
| 2002/0067097 | A1 | 6/2002 | Inoue |
| 2003/0211357 | A1 | 11/2003 | Harada et al. |
| 2005/0000262 | A1 | 1/2005 | Schreiber et al. |
| 2009/0053553 | A1 | 2/2009 | Masago et al. |
| 2010/0053785 | A1 | 3/2010 | Nishi et al. |
| 2010/0170555 | A1 * | 7/2010 | Rechid .......................... 136/244 |
| 2012/0298183 | A1 * | 11/2012 | Buresch et al. ............... 136/246 |

FOREIGN PATENT DOCUMENTS

| | | |
|---|---|---|
| EP | 1 368 140 B1 | 12/2003 |
| JP | 06-116745 * | 4/1994 |
| WO | WO 97/31783 | 9/1997 |
| WO | WO 2008/025326 * | 3/2008 |
| WO | WO 2009/013944 A1 | 1/2009 |
| WO | WO 2010/017289 A1 | 2/2010 |

OTHER PUBLICATIONS

Form PCT/ISA/220 mailed May 14, 2012 (1 page).
Form PCT/ISA/210 mailed May 14, 2012 with English translation of categories of documents cited (5 pages).
Form PCT/ISA/237 mailed May 14, 2012 (9 pages).

* cited by examiner

ELECTROOPTICAL OR ELECTROMECHANICAL COMPONENT OR SLIDING ELEMENT

The invention relates to an electrooptical or electromechanical component or sliding element.

Possibilities of structuring surfaces by rolling are already known from the aluminum and steel industries, aluminum and steel sheets being structured for use as bodywork components so that, during the subsequent stretching, no flow lines are visible on the bodywork surface after painting. Examples of methods for structuring the surfaces of working rolls or of the strips directly are laser texturing, grinding and abrasive blasting. So-called EBT methods (electron beam texturing) or EDT methods (electro discharge texturing) are also already-known production methods for textured surfaces. This type of roll structuring, however, leads to very rough surfaces with irregular geometrical shapes, which in many applications do not satisfy the requirements for optical or mechanical properties.

Document EP 1 146 971 B1 discloses a mechanically structured sheet of an aluminum alloy, which is suitable for reflector systems in lighting. For these applications, the sheets need to have appropriate photometric properties. The most important photometric properties include a high overall reflection, by which a maximum fraction of the incident light is reflected from the surface. The preferred properties of the sheet surface furthermore include diffuse or nondirectional light reflection. Such properties are achieved by rolling the sheet material with at least one structured working roll. A nondirectional, diffusely reflecting sheet surface is produced, on the entire surface of which randomly shaped microscopic depressions are formed. The depressions should preferably create an inter-engaging configuration of roof tile-like structures lying close to one another or overlapping.

Further applications are known from document EP 1 368 140 B1. In the method described, a metal sheet or metal strip is fed between rolls which have a textured pattern on the surface, and this pattern is transferred over a plurality of rolling passes onto the sheet or strip. The structures imparted by each rolling pass overlap to form the final textured pattern. Such a structure may also be produced by means of a rolling pass between a multiplicity of successively arranged roll pairs. The texturing of an aluminum strip after a multiplicity of rolling passes comprises a microscopic surface pattern. By a minimal degree of deformation, substantially original and undistorted structures defined by the rolls are sought. Metal sheets produced in this way are preferably employed as lithographic plates or as automobile reflector sheets.

Further lithographic plates are known from document WO 97/31783 A1. The rolled structure is in this case formed as a uniform and nondirectional microstructure, in which the depressions imparted to the surface overlap one another to a large extent or merge into one another.

It is an object of the invention, in the case of an electromechanical component or a sliding element, to improve the functionality with respect to the friction properties. In the case of an electrooptical component, the functionality with respect to reflection and cooling is intended to be optimized. The invention is reflected by these features.

The invention relates to an electrooptical or electromechanical component, in particular an LED, jack connector or lead frame, or a sliding element, consisting of a rolled metal substrate made of a metal strip or a sheet produced therefrom made of Cu or Cu alloy strip, an Al or Al alloy strip, an Fe or Fe alloy strip, a Ti or Ti alloy strip, an Ni or Ni alloy strip or a stainless steel strip. The metal substrate comprises a surface structure having a roughness in the range of Ra=0.01-8 µm and/or Rz=0.01-30 µm. The surface structure comprises depressions having a minimum lateral extent of 0.3-300 µm. The depressions are arranged in an open structure with a lateral extent extending parallel to the strip surface with a length/width ratio of from 10:1 to 1:10, the length being measured in the rolling direction and the width being measured perpendicularly to the rolling direction. The profile void factor $\lambda p$ lies in the range from 0.25 to 0.65.

The invention is based on the idea that the surface of a rolled metal substrate in the form of a metal strip or metal sheet for use in electrooptical or electromechanical components or sliding elements is subjected to fine configuration of the surface. The fine structure may be introduced into an uncoated strip or sheet surface, or into a surface already covered with at least one layer. The rolls required for this, in order to produce the fine sheet structures, are already known in bodywork construction. They comprise, for example, roll surfaces having an electrolytically generated structure and hard chrome plating.

In the context of the invention, open structures are intended to mean a surface configuration on the substrate material which comprises individual depressions on a surface which still has a smooth appearance. Neighboring depressions may for example also touch or slightly overlap although they do not merge into one another as structural elements in such a way that the topography of the surface only has the appearance of uniform roughness. It is therefore a fine structure formed from a substrate surface by rolling, comprising a more or less smooth undeformed original background. For example, the roll structure marketed under the brand name PRETEX is to be understood here. For such surfaces, it is important that the original background of the surface comprises a large surface percentage bearing area.

The depressions with the indicated minimum lateral extent may have circular shapes. Furthermore, oval shapes may also be envisaged. In the case of an elliptical shape, the minimum lateral extent is two times the minor axis of the ellipse. In the case of circular shapes, the minimum lateral extent corresponds to the circle diameter. The various depressions themselves may either vary in their extent throughout the interval in the range of 0.3-300 µm, or fluctuate to a small extent about a particular value. For example, a typical value of the minimum lateral extent is 20 µm which, in approximation to a Gaussian normal distribution, has a variation range with a standard deviation of 5 µm. In order to produce uniform structural sizes, narrower limits may also be established in the interval indicated. In practice, a certain albeit small variation range of the minimum extent, once selected, will always occur.

In principle, depressions are arranged in the open structure with a lateral extent extending parallel to the strip surface with a length/width ratio of from 10:1 to 1:10, the length being measured in the rolling direction and the width being measured perpendicularly to the rolling direction. In general, length/width ratios of 1:1 are sought, which correspond to a circular edge boundary line. Depending on the configuration of the depressions and the strip tension during the rolling, however, some degree of stretching may occur.

The conventional roughness parameters Ra and Rz on their own do not yet satisfactorily define the formation of the surface profile shapes. The description of such profile shapes by means of measurement methods is carried out using the profile void factor $\lambda p$. What is important for the profile shapes, in this case, is that a shape is selected which primarily has a suitable percentage bearing area. The roughness parameters may also be described by means of the Abbott bearing area curve tp and the spatial void factor.

The particular advantage is that the structures according to the invention can substantially improve the coefficient of friction, the susceptibility to wear, the susceptibility to friction corrosion and the contact behavior, in particular after deformation, and therefore the functionality for jack connectors. In particular, the coefficient of friction is reduced. When using laser welding methods, the beam input is also positively influenced by the low reflectivity of the surface. In this way, even in the case of highly reflective surface coatings, the surface structure allows joining by optical methods and simultaneously improves the functional properties of the components during use. Furthermore, with the surface structured according to the invention, for example in punching/bending processes or other shaping techniques such as deep drawing, the use of lubricant can be reduced.

Preferably, in the electromechanical components or sliding elements, the ratio of the minimum lateral extent to the depth of the depressions may be at least 1:83. Thus, for small ratios, depressions are also envisaged whose depth significantly exceeds the lateral extent parallel to the substrate surface. For larger ratios, substantially flatter structures are introduced into the substrate surface, which are nevertheless still configured so that the coefficient of friction is efficiently reduced. Preferably, width to depth ratios which are favorable in terms of production technology as well as their efficiency may be configured in the range from 1:3 to 3:1.

Advantageously, in the electromechanical components or sliding elements, the depressions may be formed hemispherically, pyramidally or with polygonal faces. In order to satisfy the stringent requirements for the surface properties, surface structures on the strip surface which are absolutely reproducible geometrically are required. Hemispherical cap-like or pyramidal depressions in the strip surface, which have a particular diameter to width ratio and an absolute depth, and which are formed separately as well as overlapping in their shape, have been found to be advantageous. Their arrangement is statistically distributed, although the percentage bearing area of the surface should not be less than 30%. Such geometries ensure a particular reduction of the coefficient of friction and can be produced well by rolling methods.

Preferably, the depressions of the surface structure may be produced by means of rolling with structured working rolls, which have a surface comprising spherical cap-shaped, pyramidal or polygonal elevations. The roll surface forms the negative of the fine structure to be introduced into a strip or sheet surface.

Advantageously, the structure may be formed stochastically or regularly periodically. In the case of regularly periodic structures, flat island-shaped regions which have no overlapping structures, or only slightly overlapping structures, may also locally reduce the coefficient of friction.

In an advantageous configuration of the invention, the substrate surface to be structured may be blank, roll-plated or coated with Sn, Ag, Au, Ni, Zn, Pd or alloys thereof. As an alternative, the coating of the substrate surface with Sn, Ag, Au, Ni, Zn, Pd and alloys thereof may also be carried out after the rolling with the structured working rolls. In the case of jack connectors or lead frames, for example, specifically for a surface coated with Sn or with noble metals, the surface quality according to the invention is suitable for efficient input of the laser beam into the material for laser welding. In the case of jack connectors, which are generally coated with Sn, Ag, Au, Zn, Ni or alloys thereof, the surface structure according to the invention is such that the insertion and extraction forces are lowered by reducing the coefficient of friction.

Preferably, hot-dip processing, galvanic coating, PVD, CVD methods, cathodic or anodic dip coating or chemical coating may be used as the coating method before or after the rolling, or, before the rolling, roll plating.

Advantageously, a spatial void factor $\lambda r$ may be formed in the range from 0.49 to 0.8. Such products are preferably suitable for optical joining methods.

Exemplary Embodiment

A CuSn3Zn9 strip was rolled with a correspondingly structured working roll and subsequently galvanically plated with a 3 μm layer thickness and heat-treated, so that an intermetallic phase of 1 μm was formed. In a wear test with a so-called "rider on flat" sample arrangement, it was possible to achieve a significant reduction of 0.7 in the coefficient of friction for standard surfaces, produced by rolling with ground working rolls to 0.45-0.5. The strip roughness was in this case comparable, and was Rz=1.4 and Ra=0.27, in each case perpendicularly to the rolling direction. The isotropy of the surface, rolled with the specially structured roll surface, with a standard deviation of merely ±0.003 μm between the directions parallel and perpendicular to the RD, was outstanding. Such strips are used, for example, in electrical engineering for jack connectors. This copper/multicomponent alloy has good spring properties and is distinguished by low susceptibility to stress crack corrosion.

Other exemplary embodiments of the invention will be explained in more detail below with the aid of the schematic drawing and the further figures, in which:

FIG. 1 schematically shows a rolling process on a substrate surface,

Parts which correspond to one another are provided with the same references in all the figures.

Figure 1:
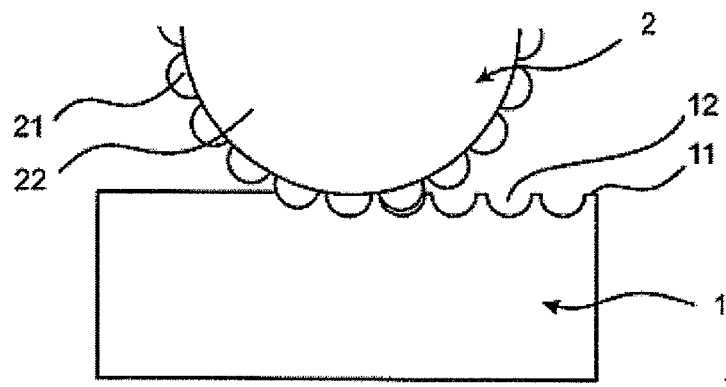

FIG. 1 schematically shows a rolling process on the surface of a metal substrate 1. The surface is configured as an open structure. In order to form open structures, individual depressions 12 are rolled in on the metal substrate 1 over an undeformed surface 11 still having a smooth appearance. On the rolling body 22 of the roll 2 used, spherical caps 21 are arranged on the surface, which penetrate into the surface of the metal substrate 1. These spherical caps 21 are for example of equal size, so that they generate a uniform negative structure on the substrate surface. As an alternative, however, the structure size of the roll surface may vary somewhat more greatly and also assume other shapes, for example a pyramidal shape or cylindrical shape. In any event, this is a fine structure, comprising a more or less smooth undeformed original background of the initial surface, formed by rolling from a substrate surface.

Figure 2:
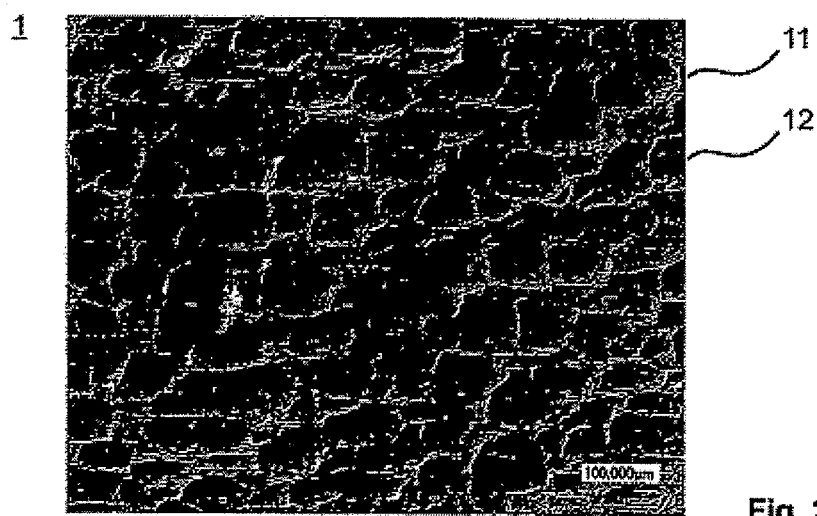
FIG. 2 shows a rolled substrate surface comprising an open structure.

FIG. 2 shows a rolled substrate surface comprising an open structure. In the rolling direction, from left to right in the figure, the depressions 12 are somewhat stretched. This occurs either owing to an increased strip tension during the rolling process or owing to a roll surface comprising structures which are elongated in the rolling direction. In this case, the depressions are formed in an open structure having a lateral extent extending parallel to the strip surface with a length/width ratio of approximately 2:1, the length being measured in the rolling direction, from left to right in FIG. 2, and the width being measured perpendicularly to the rolling direction, from top to bottom in FIG. 2. Remainders of the smooth undeformed surface 11 can be seen on the surface of the metal substrate 1 between the depressions 12.

Figure 3:
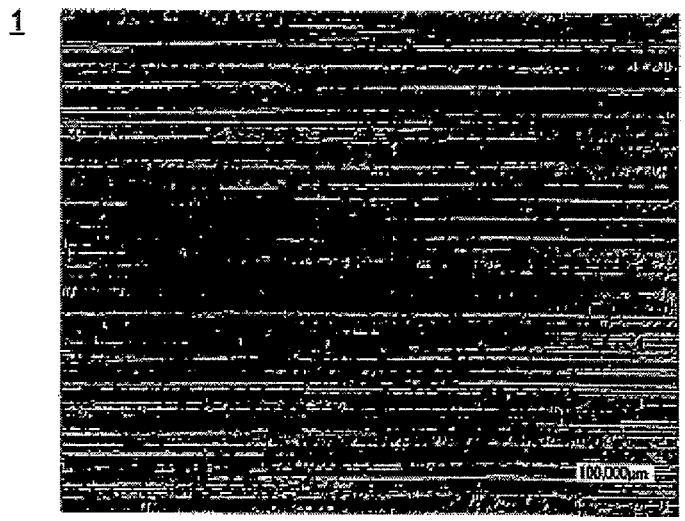
FIG. 3 shows an undeformed substrate surface in the starting state.

For comparison, FIG. 3 shows an undeformed surface of a metal substrate 1 in the original state before the rolling. No depressions have yet been rolled in on this surface, and only fine grinding grooves extending parallel can be seen.

The invention claimed is:

1. An electrooptical or electromechanical component comprising a rolled metal substrate made of a metal strip or a sheet produced therefrom made of a Cu or Cu alloy strip, Al or Al alloy strip, Fe or Fe alloy strip, Ti or Ti alloy strip, Ni or Ni alloy strip or a stainless steel strip, characterized in that
    the metal substrate comprises a surface structure having a roughness in the range of Ra=0.01-8 μm and/or Rz=0.01-30 μm,
    the surface structure comprises depressions having a minimum lateral extent of 0.3-300 μm formed in a surface portion of the metal substrate which was undeformed when the depressions were formed therein,
    the openings of the depressions have circular, oval, elliptical or pyramidal shapes and are arranged stochastically in an open structure with a lateral extent extending parallel to the strip surface with a length/width ratio of from 10:1 to 1:10, the length being measured in the rolling direction and the width being measured perpendicularly to the rolling direction,
    the profile void factor λp lies in the range from 0.25 to 0.65 and a coating of the substrate surface with Sn, Ag, Au, Ni, Zn, Pd and alloys thereof is applied after rolling with a structured working roll.

2. The component as claimed in claim 1, characterized in that the ratio of the minimum lateral extent to the depth of the depressions is at least 1:83.

3. The component as claimed in claim 1, characterized in that the surface structure is produced by means of rolling with a structured working roll, which has a surface comprising spherical cap-shaped or pyramidal elevations.

4. The component as claimed in claim 1, characterized in that the substrate surface is coated by hot-dip processing, galvanic coating, PVD, CVD, cathodic or anodic dip coating, chemical coating or roll plating.

5. The component as claimed in claim 1, wherein the metal substrate is made of a Cu or Cu alloy strip, Al or Al alloy strip, Fe or Fe alloy strip, Ti or Ti alloy strip or Ni or Ni alloy strip.

6. The component as claimed in claim 5, wherein the metal substrate is made of a Cu alloy strip.

7. The component as claimed in claim 1, characterized in that a spatial void factor λr is formed in the range from 0.49 to 0.8.

8. An electrooptical or electromechanical component comprising a rolled metal substrate made of a metal strip or a sheet produced therefrom made of a Cu or Cu alloy strip, Al or Al alloy strip, Fe or Fe alloy strip, Ti or Ti alloy strip, Ni or Ni alloy strip or a stainless steel strip, characterized in that
    the metal substrate comprises a surface structure having a roughness in the range of Ra=0.01-8 μm and/or Rz=0.01-30 μm,
    the surface structure comprises depressions having a minimum lateral extent of 0.3-300 μm formed in a surface portion of the metal substrate which was undeformed when the depressions were formed therein,
    the openings of the depressions have circular, oval, elliptical or pyramidal shapes and are arranged stochastically in an open structure with a lateral extent extending parallel to the strip surface with a length/width ratio of from 10:1 to 1:10, the length being measured in the rolling direction and the width being measured perpendicularly to the rolling direction,
    the profile void factor λp lies in the range from 0.25 to 0.65 and the substrate roll-plated or coated with Sn, Ag, Au, Ni, Zn, Pd or alloys thereof prior to rolling with a structured working roll.

9. The component as claimed in claim 8, characterized in that the ratio of the minimum lateral extent to the depth of the depressions is at least 1:83.

10. The component as claimed in claim 8, characterized in that the surface structure is produced by means of rolling with a structured working roll, which has a surface comprising spherical cap-shaped or pyramidal elevations.

11. The component as claimed in claim 8, characterized in that the substrate surface is coated by hot-dipping processing, galvanic coating, PVD, CVD, cathodic or anodic dip coating, chemical coating or roll plating.

12. The component as claimed in claim 8, wherein the metal substrate is made of a Cu or Cu alloy strip, Al or Al alloy strip, Fe or Fe alloy strip, Ti or Ti alloy strip or Ni or Ni alloy strip.

13. The component as claimed in claim 12, wherein the metal substrate is made of a Cu alloy strip.

14. The component as claimed in claim 8, characterized in that a spatial void factor λr is formed in the range from 0.49 to 0.8.

* * * * *